United States Patent
Lee et al.

(10) Patent No.: US 9,774,267 B2
(45) Date of Patent: Sep. 26, 2017

(54) POWER SUPPLIES AND CONTROL METHODS SUITABLE FOR SEQUENTIALLY TRANSMITTING COMMAND BITS FROM SECONDARY SIDE TO PRIMARY SIDE

(71) Applicant: Leadtrend Technology Corporation, Zhubei (TW)

(72) Inventors: Ching-Tsan Lee, Zhubei (TW); Mao-Shih Li, Zhubei (TW); Hsin Hung Lu, Zhubei (TW); San Yi Li, Zhubei (TW)

(73) Assignee: LEADTREND TECHNOLOGY CORPORATION, Zhubei, Hsinchu County (TW)

( * ) Notice: Subject to any disclaimer, the term of this patent is extended or adjusted under 35 U.S.C. 154(b) by 0 days.

(21) Appl. No.: 15/174,169

(22) Filed: Jun. 6, 2016

(65) Prior Publication Data

US 2016/0365796 A1    Dec. 15, 2016

(30) Foreign Application Priority Data

Jun. 11, 2015  (TW) .............................. 104118866 A
Jan. 22, 2016  (TW) .............................. 105102000 A

(51) Int. Cl.
H02M 3/335  (2006.01)

(52) U.S. Cl.
CPC ... *H02M 3/33523* (2013.01); *H02M 3/33515* (2013.01)

(58) Field of Classification Search
CPC ........................ H02M 3/335; H02M 3/33515
USPC .......................... 363/21.12–21.18, 131, 132
See application file for complete search history.

(56) References Cited

U.S. PATENT DOCUMENTS

| | | | | |
|---|---|---|---|---|
| 5,841,641 A | * | 11/1998 | Faulk ..................... | H02M 3/335 363/21.14 |
| 6,301,135 B1 | * | 10/2001 | Mammano ........ | H02M 3/33523 363/132 |
| 8,492,987 B2 | | 7/2013 | Nuhfer et al. | |
| 8,719,811 B2 | * | 5/2014 | Vulugundam ..... | H04N 1/00323 717/173 |

(Continued)

FOREIGN PATENT DOCUMENTS

| | | |
|---|---|---|
| CN | 201080055581.9 | 9/2012 |
| CN | 201110306257.6 | 4/2013 |

*Primary Examiner* — Adolf Berhane
*Assistant Examiner* — Nusrat Quddus
(74) *Attorney, Agent, or Firm* — McClure, Qualey & Rodack, LLP

(57) ABSTRACT

A control circuit suitable for a power supply. The power supply has a transformer with a primary winding and a secondary winding magnetically coupled to each other. The transformer is configured to transfer electric energy from a primary side to a secondary side and to build an output power source in the secondary side. The control circuit has a primary-side controller and a secondary-side controller. The primary-side controller is in the primary side, configured to control a current through the primary winding. In the secondary side, the secondary-side controller is powered by the output power source and configured to provide a command code with several command bits sequentially transmitted to the primary-side controller, so as to set an operation mode that the primary-side controller operates in.

26 Claims, 8 Drawing Sheets

(56) References Cited

U.S. PATENT DOCUMENTS 9,035,563 B2 5/2015 Nuhfer et al.
9,036,385 B2 5/2015 Wu et al.

* cited by examiner

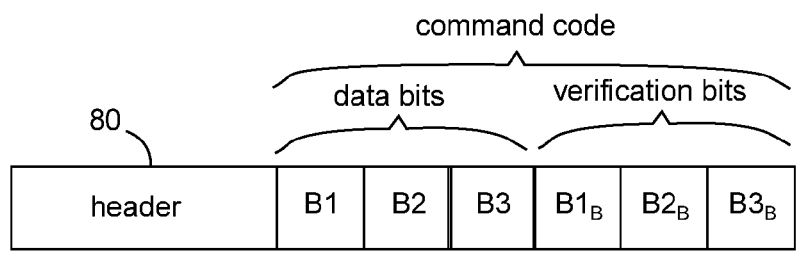
FIG. 3A
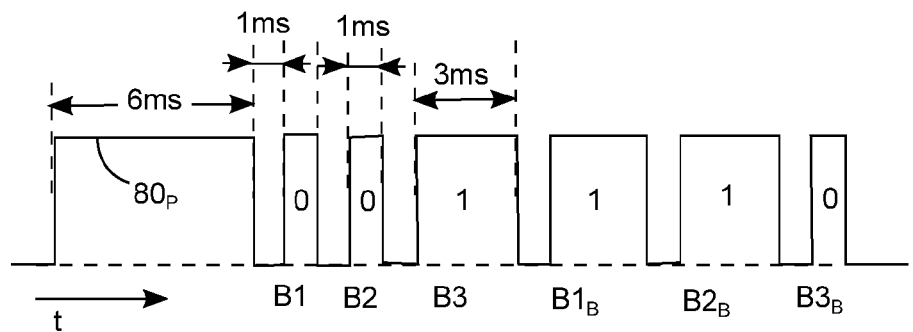
FIG. 3B
| command code | | | | | | | |
|---|---|---|---|---|---|---|---|
| data bits | | | verification bits | | | | |
| B1 | B2 | B3 | B1$_B$ | B2$_B$ | B3$_B$ | code duration | function |
| 0 | 0 | 0 | 1 | 1 | 1 | 18ms(=6ms+12ms) | reserved |
| 0 | 0 | 1 | 1 | 1 | 0 | 18ms(=8ms+10ms) | voltage rating = 5V |
| 0 | 1 | 0 | 1 | 0 | 1 | 18ms(=8ms+10ms) | voltage rating = 9V |
| 0 | 1 | 1 | 1 | 0 | 0 | 18ms(=10ms+8ms) | voltage rating = 12V |
| 1 | 0 | 0 | 0 | 1 | 1 | 18ms(=8ms+10ms) | reserved |
| 1 | 0 | 1 | 0 | 1 | 0 | 18ms(=10ms+8ms) | reserved |
| 1 | 1 | 0 | 0 | 0 | 1 | 18ms(=10ms+8ms) | voltage rating = 20V |
| 1 | 1 | 1 | 0 | 0 | 0 | 18ms(=12ms+6ms) | reserved |
FIG. 4

POWER SUPPLIES AND CONTROL METHODS SUITABLE FOR SEQUENTIALLY TRANSMITTING COMMAND BITS FROM SECONDARY SIDE TO PRIMARY SIDE

CROSS-REFERENCE TO RELATED APPLICATION

This application claims priority to and the benefit of Taiwan Application Series Number 105102000 filed on Jan. 22, 2016, and Taiwan Application Series Number 104118866 filed on Jun. 11, 2015 both of which are incorporated by reference in their entirety.

BACKGROUND

The present disclosure relates generally to a power supply with galvanic isolation, and more particularly, to methods and apparatuses for transmitting information from a secondary side to a primary side where the primary and secondary sides are galvanically isolated from each other.

As mobile devices are becoming more popular to the world, users rely on them and demand longer time for use before charging the next time. Thus, mobile devices are required to be more power saving, have batteries with larger capacity, and be capable of being faster charged.

Several methods for quickly charging the batteries in mobile devices have been provided. Qualcomm, for example, has announced "Quick Charge"™ 2.0. A Quick Charge enabled device sends differential signals to a charger, which according alters its output voltages for fast charging the Quick Charge enabled device. Generally speaking, the higher output voltage the faster charging.

A charger 10 is demonstrated in FIG. 1, capable of fast charging an electric device connected to a USB connector 12. In consideration of safety, the charger 10 has a primary side 14P and a secondary side 14S galvanically isolated from each other. In other words, there is no direct current connection between the primary side 14P and the secondary side 14S. The circuitry at the primary side 14P is majorly powered by input power source VIN and input ground line GNDI, both of which are generated from bridge rectifier 16 rectifying an alternating current (AC) power source $V_{AC-IN}$ from a power grid. A secondary winding LS at the secondary side 14S could demagnetize to provide output power source VOUT and output ground line GNDO.

A secondary-side controller 18 receives differential signal from lines D+ and D− of the USB connector 12, to set an operation mode the primary-side controller 20 operates in. Accordingly, primary-side controller 20 controls power conversion so as to determine the voltage rating of the output power source VOUT. The voltage rating refers to a voltage level that the output power source VOUT is controlled to approach. In FIG. 1, the secondary-side controller 18 generates a pulse-width modulation (PWM) signal $S_D$ to drive emitter 26E of a photo coupler 26. Receiver 26R of the photo coupler 26 and a low-pass filter 24 accordingly generate a direct current (DC) signal at node R, whose voltage level accordingly corresponds to the duty cycle of PWM signal $S_D$. A translator 22 converts the DC signal at node R to provide signals setting the primary-side controller 20.

In case that the differential signal from lines D+ and D− demands the voltage rating of the output power source VOUT to be 12V, for instance, the secondary-side controller 18 provides the PWM signal $S_D$ with a duty cycle of 50%. As a result, the DC voltage at node R is 2.5V, which causes the translator 22 to make the primary-side controller 20 regulating the output voltage $V_{OUT}$ of the output power source VOUT at 12V. Similarly, if the differential signal from lines D+ and D− demands the voltage rating of the output power source VOUT to be 20V, the duty cycle of the PWM signal $S_D$ becomes almost 100%, the DC voltage at node R 5V, so the output voltage $V_{OUT}$ of the output power source VOUT starts to approach 20V.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein:

FIG. 3A shows a data structure that the driving signal $S_{STREAM}$ presents;

FIG. 3B shows a waveform of the driving signal $S_{STREAM}$;

FIG. 4 shows a table listing possible combinations of command bits;

DETAILED DESCRIPTION

Figure 1:
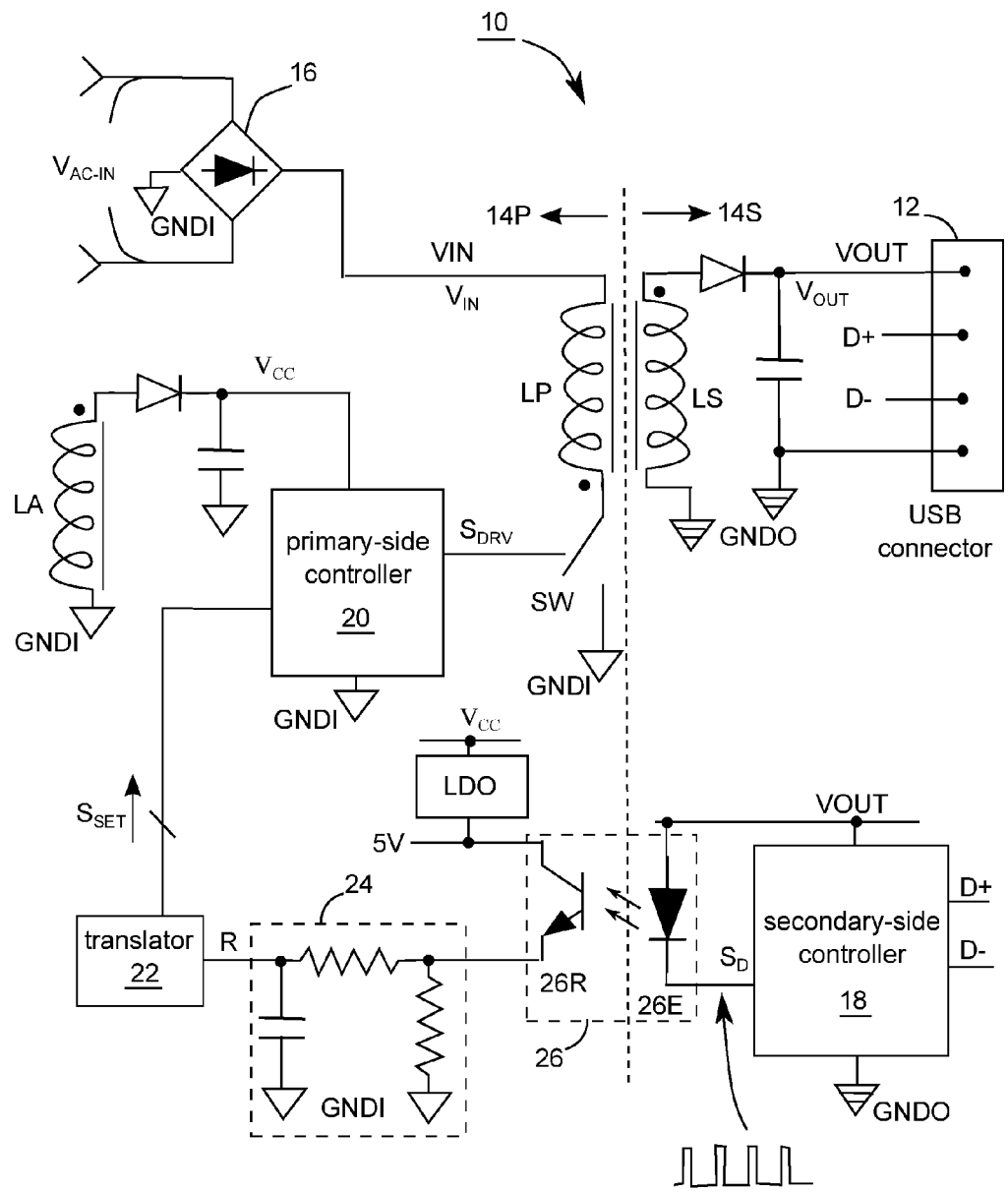
FIG. 1 demonstrates a conventional charge in the art.
Figure 2:
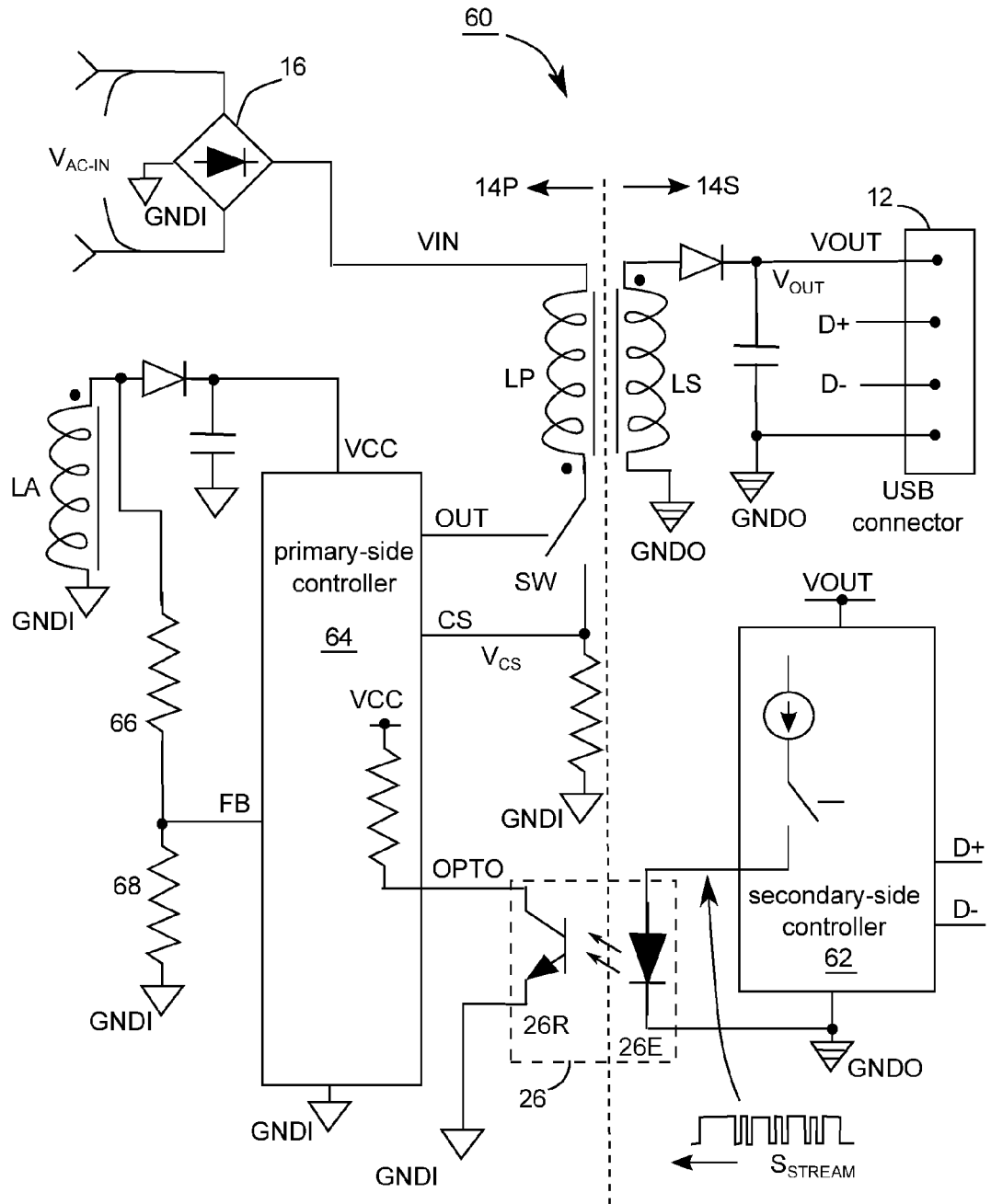
FIG. 2 demonstrates a charger as a power supply according to embodiments of the invention.

FIG. 2 demonstrates a charger 60 as a power supply according to embodiments of the invention. Similar with the charger 10 in FIG. 1, the charger 60 in FIG. 2 provides galvanic isolation to separate the primary side 14P and the secondary side 14S. A transformer has a primary winding LP and an auxiliary winding LA at the primary side 14P, and a secondary winding LS at the secondary side 14S, while these three windings are inductively coupled to one another. By switching a power switch SW, a primary-side controller 64 controls the current through the primary winding LP, so as to transfer electric energy from the primary side 14P to the secondary side 14S and build up output power source VOUT in reference to output ground line GNDO at the secondary side 14S.

A secondary-side controller 62 is powered by the combination of output power source VOUT and output ground line GNDO, and a primary-side controller 64 is powered by the combination of an operation power source VCC and input ground line GNDI. The primary-side controller 64 and the secondary-side controller 62, among others, can be deemed as a control circuit to control the current through the transformer in FIG. 2.

Via photo coupler 26, which has an emitter 26E and a receiver 26R, the secondary-side controller 62 sequentially sends command bits to the primary-side controller 64. Based upon the voltage variation at node OPTO, the primary-side controller 64 can sequentially generate received bits and perform corresponding settings. In this embodiment, photo coupler 26 acts as a message channel between the primary side 14P and the secondary side 14S, but the invention is not limited to. Devices capable of providing galvanic isolation, such as a transformer or a capacitor could be candidates to replace photo coupler 26 in FIG. 2.

According to the differential signal from lines D+ and D− in FIG. 2, the secondary-side controller 62 provides command code with command bits, which are in compliance with a predetermined coding rule. Based on the command code, the secondary-side controller 62 provides driving signal $S_{STREAM}$ to drive emitter 26E. The driving signal $S_{STREAM}$ has two consecutive parts; the former part represents a header and the later part the command code. When the primary-side controller 64 recognizes a corresponding header occurring at node OPTO, it could expect the coming of messages at node OPTO that correspond to the command bits. In one embodiment, these messages generate received bits used for determining the voltage rating of the output power source VOUT.

FIG. 3A shows a data structure that the driving signal $S_{STREAM}$ presents. As mentioned before, the former part is a header 80, following which is a command code composed of 6 command bits, consisting of three data bits B1, B2 and B3, and three verification bits $B1_B$, $B2_B$, and $B3_B$. FIG. 3B shows a waveform of the driving signal $S_{STREAM}$. A header pulse $80_P$ with a pulse width of 6 ms represents header 80 and is followed by 6 command pulses, each of which is 1 ms space apart from a previous one. Each of command bits has a logic value that determines a pulse width of a corresponding command pulse. For instance, if a command bit is 1 in view of logic value, then a corresponding command pulse is expected to be 3 ms in pulse width; if a command bit is 0, then a corresponding command pulse is 1 ms in pulse width. The waveform demonstrated in FIG. 3B shows that driving signal $S_{STREAM}$ carries command bits as a sequence of (001110).

FIG. 4 shows a table listing possible combinations of command bits. In this embodiment, a command code needs to comply with a coding rule, so as to provide error detection and prevent the primary-side controller 64 from misinterpretations and wrongdoings. As demonstrated in FIG. 4, a command code has in sequential three data bits B1, B2, and B3, and three verification bits $B1_B$, $B2_B$, and $B3_B$, where the data bits B1, B2, and B3 are in inverse logic to the verification bits $B1_B$, $B2_B$, and $B3_B$ respectively. For example, whenever data bit B2 is 0, verification bit $B2_B$ is 1, and vice versa. This coding rule is beneficial in making the coding duration for transmitting the command code a constant, substantially independent to variation to the command code. As demonstrated in FIG. 4, the coding duration, the time for transmitting a command code, is always about 18 ms, no matter what the command code is.

FIG. 4 also shows in the rightest columns the functions that the command codes are set to achieve. For example, if the differential signal from lines D+ and D− in FIG. 2 is recognized to be demanding the voltage rating of the output power source VOUT to be 20V, the secondary-side controller 62 generates driving signal $S_{STREAM}$ having, beside the header 80, a command code of (110001). When the command code is (001110), (010101), (011100) or (110001), FIG. 4 shows that the voltage rating should be 5V, 9V, 12V or 20V, respectively. Some of the rightest columns in FIG. 4 are reserved for design preferences. In one embodiment, for example, a command code of (000111) forces the primary-side controller 64 to operate in a sleep mode, efficiently diminishing the standby power; and a command code of (111000) wakes up the primary-side controller 64 to start detecting the output voltage $V_{OUT}$ of output power source VOUT.

Figure 5:
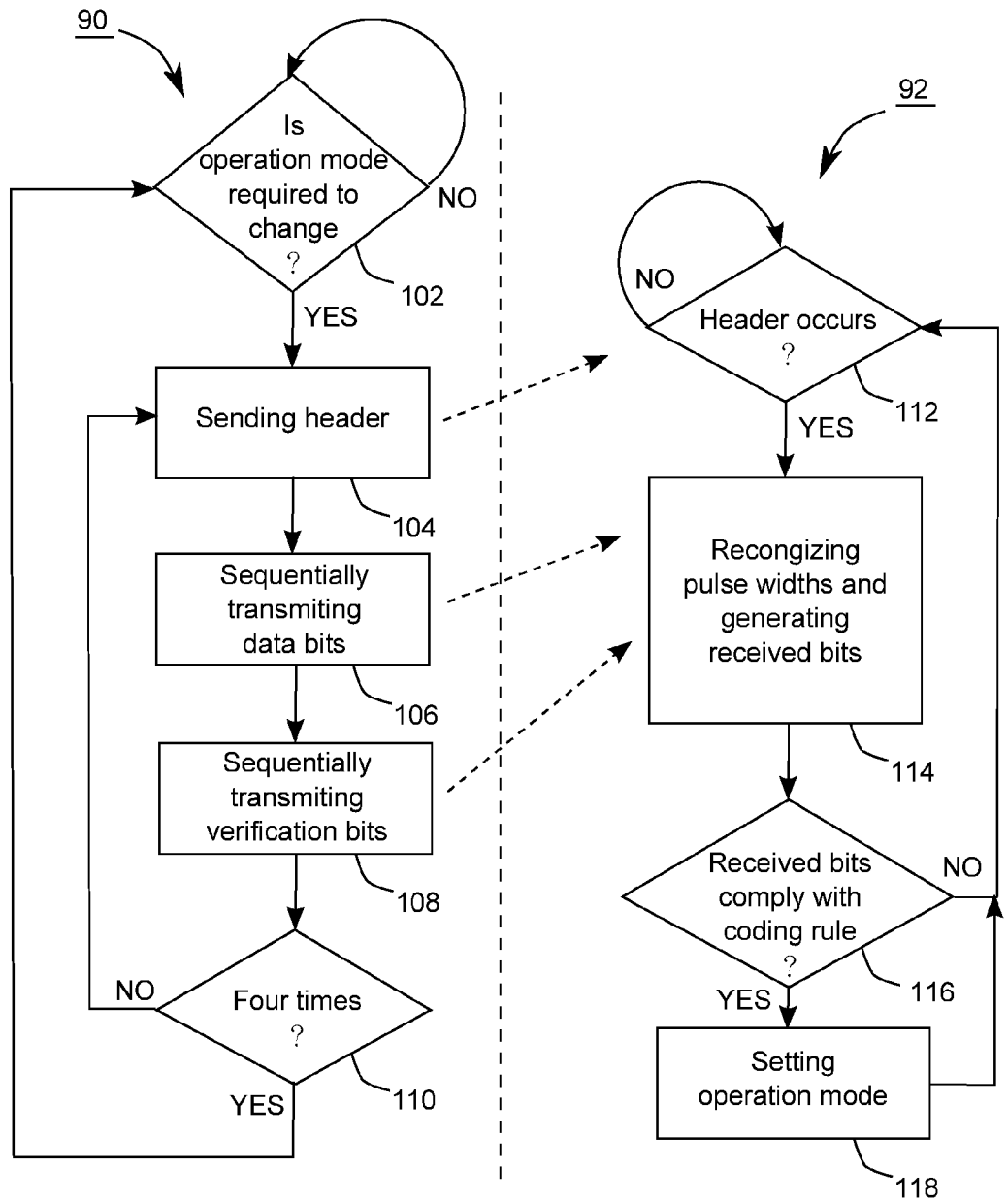
FIG. 5 shows control methods, suitable to be performed by a secondary-side controller and a primary-side controller.

FIG. 5 shows control methods 90 and 92, suitable to be performed by the secondary-side controller 62 and the primary-side controller 64, respectively.

Step 102 determines whether the operation mode that primary-side controller 62 is operating in should change. For example, the operation mode is required to change if the differential signal from lines D+ and D− switches the voltage rating of the output power source VOUT from 12V to 20V, or the output voltage $V_{OUT}$ of the output power source VOUT has been out of regulation for a predetermined period of time. In case that the operation mode need not change, the control method 90 stays at step 102. Once it is determined that the operation mode need change, step 104 follows, sending header 80 to make driving signal $S_{STREAM}$ having a 6-ms header pulse $80_P$. Then depending what the operation mode is going to be, step 106 sends data bits B1, B2 and B3, and step 108 sends verification bits $B1_B$, $B2_B$, and $B3_B$, each of steps generating corresponding pulses sequentially to driving signal $S_{STREAM}$. Please note that the data bits B1, B2, and B3 are in inverse logic to the verification bits $B1_B$, $B2_B$, and $B3_B$ respectively. Step 110 makes sure that steps 104, 106 and 108 together have been iterated for four times. In other words, as shown in FIG. 5, the control method 90 sends the header 80 and a command code four times before returning back to step 102.

The primary-side controller 64 performs the control method 92 in one embodiment. Step 112 checks whether there is the header transmitting at node OPTO. For example, the primary-side controller 64 generates internal pulses based on the voltage variation at node OPTO, and determines whether the header 80 is be transmitted in view of the pulse width of the present internal pulse currently generated. If the present internal pulse has a pulse width less than 5 ms, it is unlikely that the header 80, which is represented by a header pulse with a 6 ms pulse width, is being transmitted and the control method 92 remains at step 112. In the opposite, once the present internal pulse is determined to have a pulse width more than 5 ms, the header 80 seemingly is being transmitted, and step 114 follows. Step 114 recognizes the pulse widths of the six following consecutive internal pulses, and generates received bits with logic values based upon their pulse widths. For example, if the 6 consecutive internal pulses following the one used in step 112 have pulse widths of about 3 ms, 3 ms, 1 ms, 1 ms, 1 ms and 3 ms respectively, then the received bits are (110001) in sequence. Following step 114, step 116 determines whether the six received bits comply with the coding rule that, as exemplified by FIGS. 3A, 3B and 4, the secondary-side controller 62 uses to generate the command bits. For example, if any of the three former bits of the six received bits is not in inverse logic to a corresponding one among the three later bits of the six received bits, the six received bits definitely have something wrong, and steps 112, 114 and 116 are once again performed, to hopefully generate received bits in compliance with the coding rule. In the opposite, if the compliance with the coding rule is confirmed, step 118 follows, using the received bits to set an operation mode that the primary-side controller 64 operates in. For example, supposed the received bits are (110001), the primary-side controller 64 accordingly sets a target voltage that node FB is going to approach during demagnetization of the transformer, so as to control the power switch SW and regulate the output voltage $V_{OUT}$ of the output power source VOUT at about 20V.

In another embodiment, step 114 in FIG. 5 can be modified to receive six consecutive pulses within a certain period of time, 18 ms for example, after confirmation of the reception of a header 80. If less than six consecutive pulses occur during that certain period of time, transmission is deemed to be failed, and the primary-side controller 64 returns back to step 112, waiting next header 80.

In FIG. 2, command bits of command code are sequentially transmitted from secondary side 14S to primary side 14P, via single photo coupler 26 with emitter 26E and 26R. In comparison with the charger 10 in FIG. 1, the charger 60 of FIG. 2 is beneficial in view of cost at least because of the lack of low-pass filter 24.

Furthermore, in one embodiment, command bits need to comply with a coding rule, as demonstrated by FIGS. 3A, 3B and 4. Therefore, it is possible to prevent the primary-side controller 64 from misinterpretation and wrongdoing.

The command code in FIGS. 3A, 3B and 4 has a code length of 6 bits, but the invention is not limited to. The code length of a command code could be 2 bits or more. The coding rule demonstrated in FIGS. 3A, 3B and 4 is only taken as an example, and other embodiments of the invention might utilize different coding rules, which for example could provide automatic error correction if there is only one error bit among the received bits.

Even though it is node OPTO via which the primary-side controller 64 receives the command bits from the secondary side 14S, but the invention is not limited to. It is possible that in other embodiments the primary-side controller 64 receives the command bits from another node. For example, in one embodiment it is the feedback node FB that the primary-side controller 64 receives the command bits from, where the feedback node FB is the joint between resisters 68 and 66, both connected in series between two terminals of the auxiliary winding LA. Meanwhile, the feedback node FB is a multi-function pin, performing at least two functions: detection of output voltage $V_{OUT}$ and reception of the command bits. In another embodiment, it is the driving node OUT that the primary-side controller 64 receives the command bits from, while the driving node OUT is also anode through which the primary-side controller 64 drives the power switch SW. In another embodiment, it is the current-sense node CS that the primary-side controller 64 receives the command bits from, while the current-sense node CS also provides to the primary-side controller 64 a current-sense signal $V_{CS}$ representing a current through the primary winding LP.

The invention could be employed in all kinds of power supplies, and the charger 60 in FIG. 2 is merely an example. In another embodiment, the secondary-side controller 62 could be as well a synchronization controller controlling a rectifier switch which, even not shown in FIG. 2, is connected between output power source VOUT and the secondary winding LS, or between output ground line GNDO and the secondary winding LS.

Figure 6:
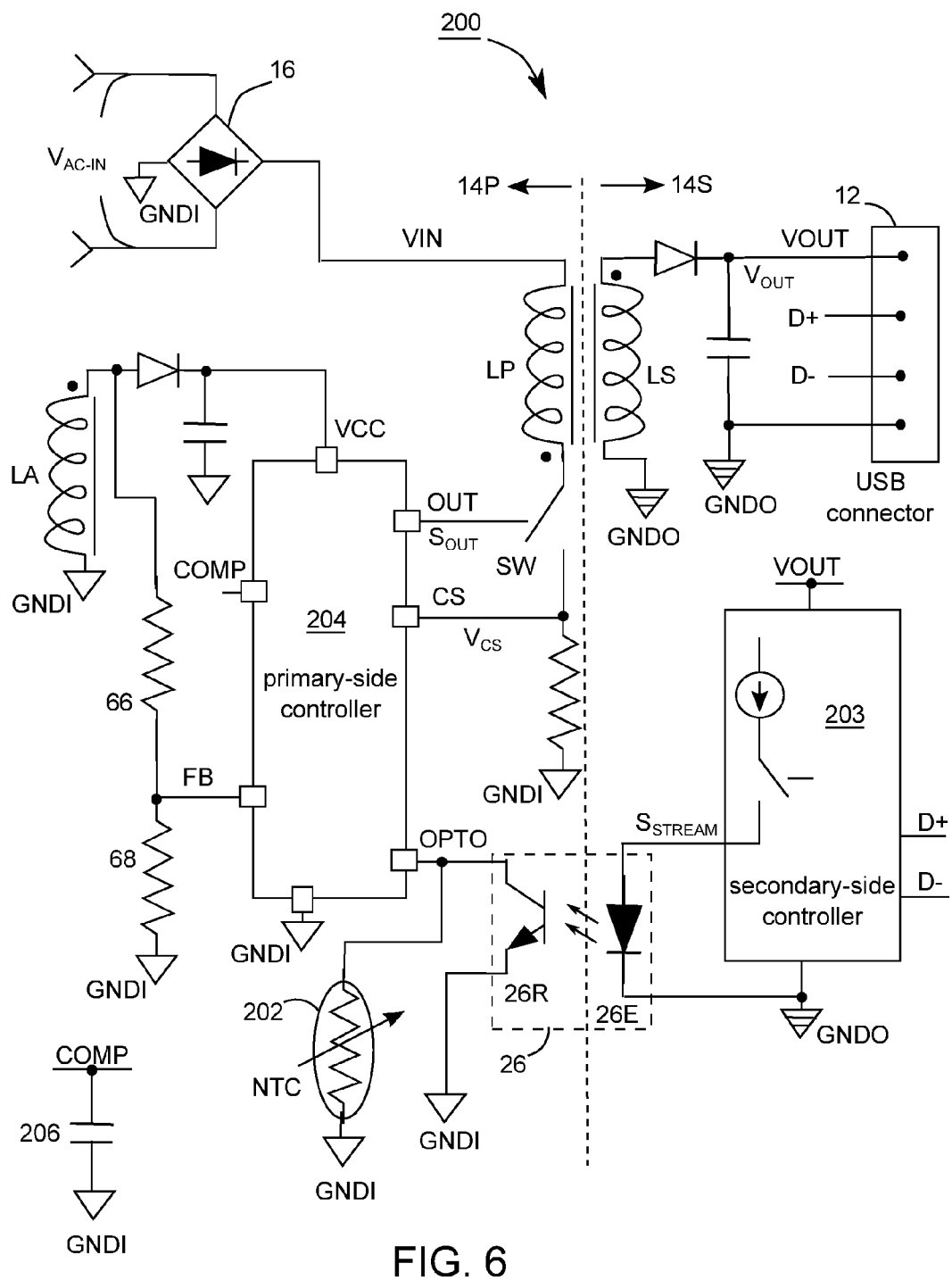
FIG. 6 is a power supply or a charger according to embodiments of the invention.

FIG. 6 is a power supply or a charger 200 according to embodiments of the invention. Charger 200 and the chargers detailed before have similar or the same components or connections that are comprehensible based upon the aforementioned teaching and will be no more detailed for brevity. Charger 200 can transmit a command code with command bits from the secondary side 14S to the primary side 14P, while the command code is encoded based on the coding rule of FIG. 4. Furthermore, charger 200 is capable of performing two additional functions: over-temperature protection (OTP) and quick response, both of which are done by way of voltage detection at node OPTO.

In one embodiment, the primary-side controller 204 and the secondary-side controller 203 are integrated circuits, and could be packaged together or separately. For the embodiment in FIG. 6, they are packaged separately. The primary-side controller 204 has 6 pins, denoted as node OPTO, driving node OUT, operation power source VCC, current-sense node CS, feedback node FB, compensation node COMP, and input ground line GNDI. The pin representing node OPTO is a multi-function pin because via it the primary-side controller 204 receives command bits from the secondary side 14S, and additionally achieves both OTP and quick response.

As shown in FIG. 6, a thermistor 202 with negative temperature coefficient (NTC) is connected between the node OPTO and input ground line GNDI, where NTC refers to the negative dependence of a thermistor on temperature. Between compensation node COMP and input ground line GNDI is a compensation capacitor 206.

Figure 7:
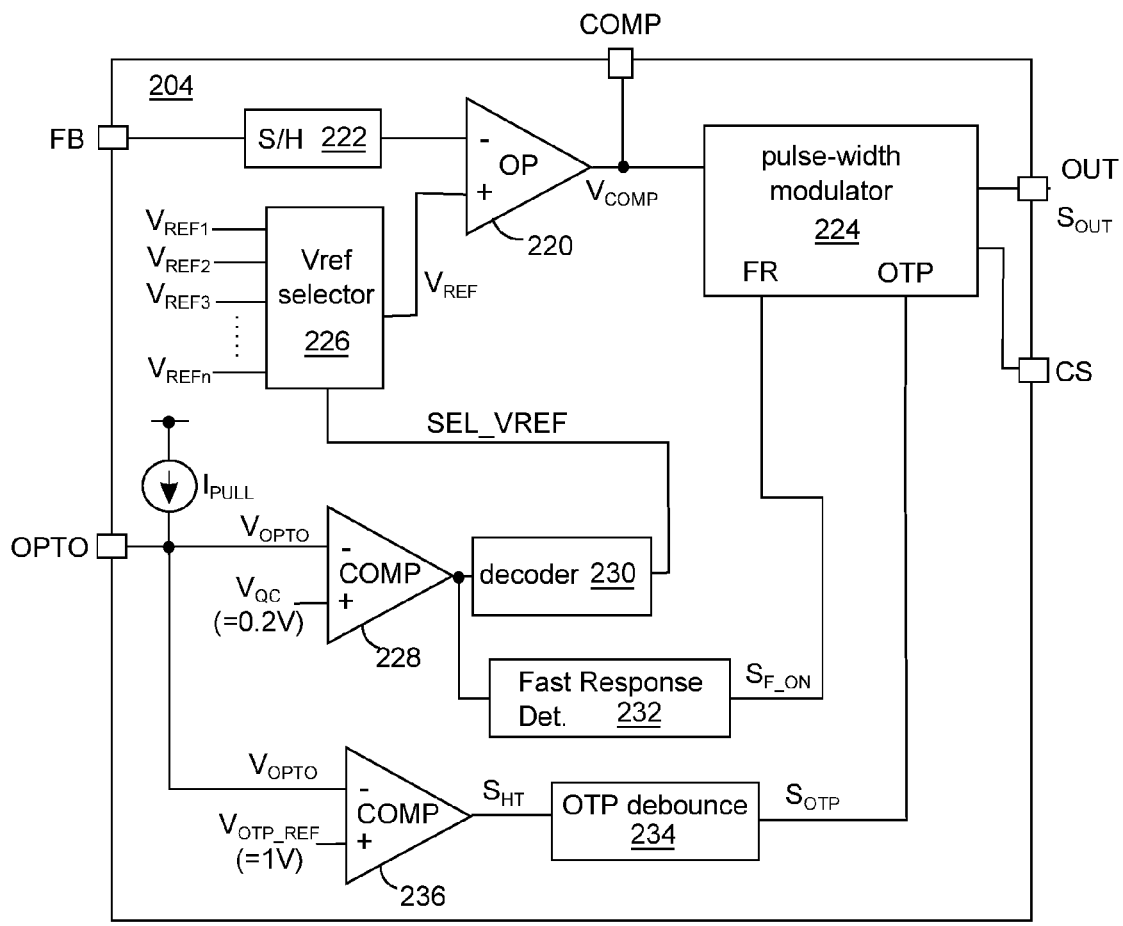
FIG. 7 illustrates portion of internal circuits inside a primary-side controller.

FIG. 7 illustrates portion of internal circuits inside the primary-side controller 204. The sample/hold circuit 222 can take a voltage sample from feedback node FB at an appropriate moment and hold it as an output, which the error amplifier 202 compares with a reference voltage $V_{REF}$ to control the compensation voltage $V_{COMP}$ at compensation node COMP. In other words, compensation voltage $V_{COMP}$ is under control of the output of the sample/hold circuit 222, which could represent a reflective voltage at the auxiliary winding and correspond to the output voltage $V_{OUT}$ of output power source VOUT. A pulse-width modulator 224, in response to compensation voltage $V_{COMP}$, modulates the pulse width or the duty cycle of the pulse-width-modulation (PWM) signal $S_{OUT}$ at driving node OUT. For instance, compensation voltage $V_{COMP}$ can determine a peak of the current-sense signal $V_{CS}$. The PWM signal $S_{OUT}$ is for regulating the output voltage $V_{OUT}$ at a voltage level corresponding to the reference voltage $V_{REF}$.

Current source $I_{PULL}$ conducts current into node OPTO, possibly raising node voltage $V_{OPTO}$. A comparator 228 compares node voltage $V_{OPTO}$ with a predetermined reference voltage $V_{QC}$, 0.2V for example, and provides a comparison result to decoder 230 and a fast response detector 232. Another comparator 236 compares node voltage $V_{OPTO}$ with another predetermined reference voltage $V_{OTP\_REF}$, 1V for example, and provides comparison result $S_{HT}$ to debouncing circuit 234, which, as detailed later, can be deemed as an OTP circuit.

Based on the coding rule of FIGS. 3A, 3B and 4, the decoder 230 senses the duration when the comparison result from comparator 228 stays at a logic value, so as to determine whether a command code is being transmitted and what the content of the command code could be. In other words, decoder 230 in association with comparator 228 translates the waveform of node voltage $V_{OPTO}$ into received bits. If the received bits are valid, or in compliance with the coding rule of FIGS. 3A, 3B and 4, the decoder 230 sends out a selection signal SEL_VREF, which causes reference-voltage selector 226 to select one of reference voltages $V_{REF1}$, $V_{REF2}$, $V_{REF3}$, ... $V_{REFn}$ to be reference voltage $V_{REF}$.

Figure 8:
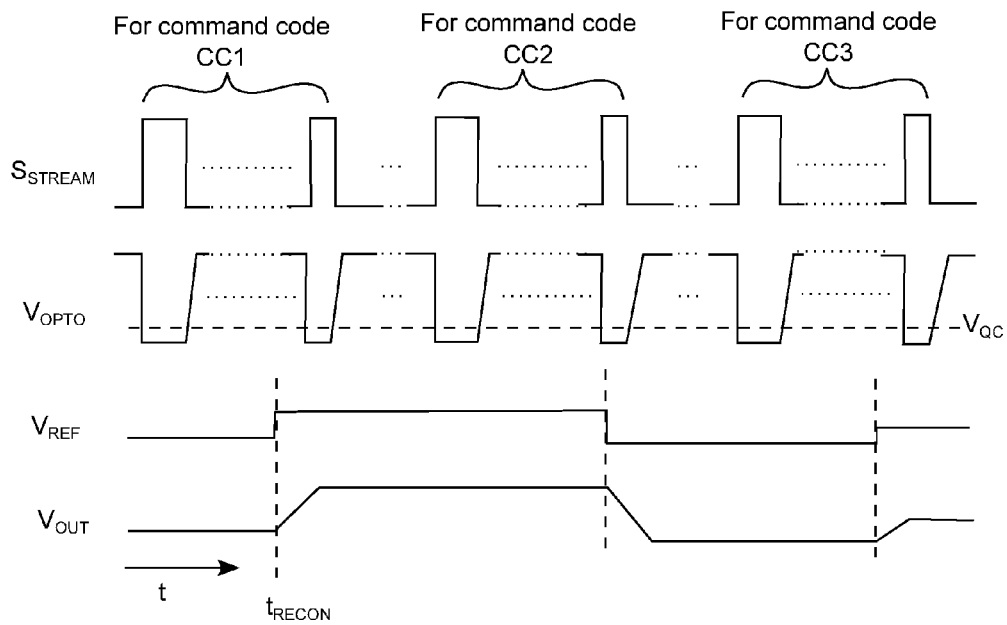
FIG. 8 shows waveforms of driving signal $S_{STREAM}$, node voltage $V_{OPTO}$, reference voltage $V_{REF}$, and output voltage $V_{OUT}$.

Please refer to FIGS. 6, 7 and 8, where FIG. 8 shows waveforms of driving signal $S_{STREAM}$ in the secondary side 14S, node voltage $V_{OPTO}$ at node OPTO in the primary side 14P, reference voltage $V_{REF}$, and output voltage $V_{OUT}$. As shown in FIG. 8, in the beginning, driving signal $S_{STREAM}$ jumps high and low to send command code CC1, and, in response, node voltage $V_{OPTO}$ varies, substantially to a reverse direction. The decoder 230 could recognize the transmission of command code CC1 from the comparison result of the comparator 228, and at the moment $t_{RECON}$ the reference voltage $V_{REF}$ is altered accordingly. In this embodiment, each command code in together with a header as a prefix will be transmitted by the secondary side controller 203 four times to drive the photo coupler 26. The decoder 230 in the primary-side controller 204 checks the validity of received bits based on the coding rule of FIG. 4. Once the received bits currently generated have been verified as being valid, meaning the command code CC1 has been safely received, the decoder 230 can immediately cause the change to reference voltage $V_{REF}$, even before the completion of four-time transmission. After reference voltage $V_{REF}$ changes, PWM signal $S_{OUT}$ switches power switch SW, making output voltage $V_{OUT}$ start approaching to a voltage rating corresponding to the newly-updated reference voltage $V_{REF}$. Similarly, when decoder 230 has acknowledged the save receipt of a command code CC2, it causes the reference-voltage selector 226 to change reference voltage $V_{REF}$ and the output voltage to start approaching to another voltage rating.

In FIG. 7, once node voltage $V_{OPTO}$ drops below reference voltage $V_{QC}$, the comparison result from the comparator 228 has a rising edge and the fast response detector 232 provides compulsive signal $S_{F\_ON}$ to node FR of pulse-width modulator 224. For example, every time when node voltage $V_{OPTO}$ drops below reference voltage $V_{QC}$, the fast response detector 232 generates a pulse at node FR to set a flip flop inside pulse-width modulator 224, forcing PWM signal $S_{OUT}$ to be 1 in logic and turning ON power switch SW. The fast response detector 232 triggers the pulse-width modulator 224 to turn ON the power switch SW. The duration when the power switch is kept ON is referred to as ON time $T_{ON}$, and the duration when the power switch is kept OFF is referred to as OFF time $T_{OFF}$. Meanwhile, the length of an ON time $T_{ON}$ is determined by compensation voltage $V_{COMP}$. If the pulse of the compulsive signal $S_{F\_ON}$ generated by the fast response detector 232 happens to be within an ON time $T_{ON}$, then this pulse will be ignored by pulse-width modulator 224 since the power switch has been ON already. If the pulse happens to be within an OFF time $T_{OFF}$, then the pulse-width modulator 224 will turn ON power switch SW to start a new ON time $T_{ON}$ right after both two conditions are satisfied. The first condition is the occurrence of the pulse, and the second condition the end of a minimum OFF time $T_{OFF-MIN}$ which is a very short period of time following an ON time $T_{ON}$ and represents the minimum of an OFF time $T_{OFF}$. Only when the minimum OFF time $T_{OFF-MIN}$ has lapses is the power switch PW allowed to be turned ON. If the pulse of the compulsive signal $S_{F\_ON}$ appears within an OFF time $T_{OFF}$ and behind the end of the minimum OFF time $T_{OFF-MIN}$, the pulse-width modulator 224 will turn ON the power switch SW ASAP to start a new ON time $T_{ON}$.

Figure 9:
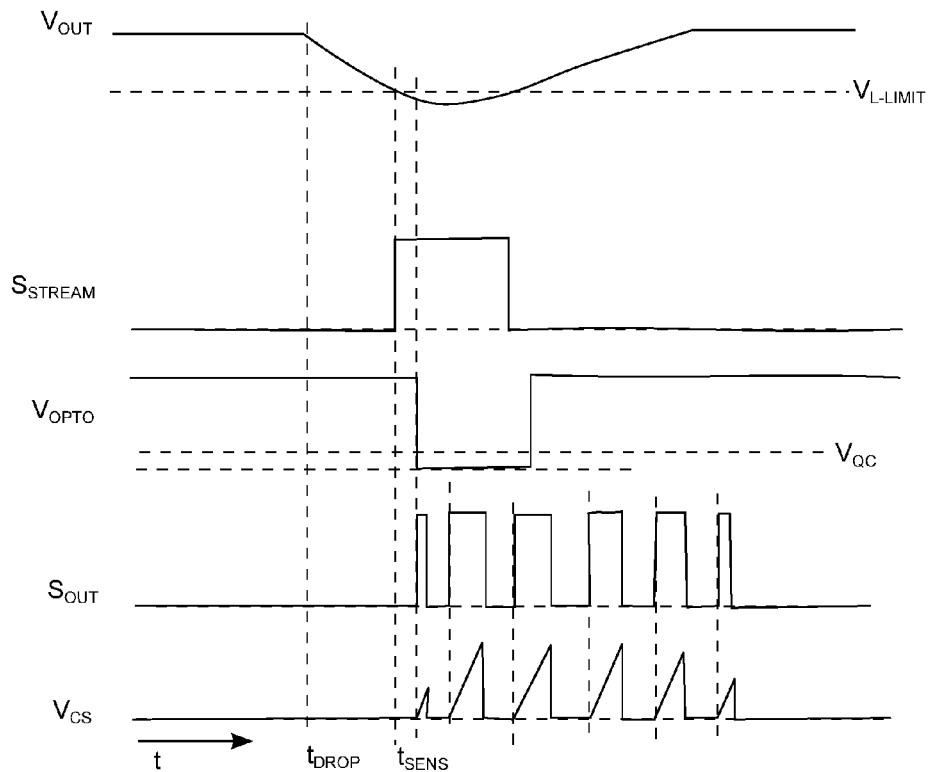
FIG. 9 shows waveforms of output voltage $V_{OUT}$, driving signal $S_{STREAM}$, node voltage $V_{OPTO}$, the PWM signal $S_{OUT}$, and current-sense signal $V_{CS}$.

Please refer to FIG. 9, which shows waveforms of output voltage $V_{OUT}$ in the secondary side 14S, driving signal $S_{STREAM}$, node voltage $V_{OPTO}$ at node OPTO in the primary side 14P, the PWM signal $S_{OUT}$, and current-sense signal $V_{CS}$. It is supposed in FIG. 9 that the charger 200 stays in no load condition in the beginning. Therefore, in the beginning, the output voltage $V_{OUT}$ is about a constant, equal to a voltage rating, and the PWM signal $S_{OUT}$ remains 0 in logic, keeping power switch SW OFF. At the moment $t_{DROP}$, the load of charger 200 suddenly becomes heavy, causing output voltage $V_{OUT}$ to drop. Meanwhile, the primary-side controller 204 is inevitably blind to the falling of output voltage $V_{OUT}$, because only when the secondary winding LS is demagnetizing can sample/hold circuit 222 detect output voltage $V_{OUT}$. At the moment $T_{SENS}$, the secondary-side controller 203 detects that output voltage $V_{OUT}$ has dropped down blow a lower-limit voltage $V_{L-LIMIT}$, and, in response, urgently turns the driving signal $S_{STREAM}$ from a low voltage level to a high voltage level. As signal propagates, node voltage $V_{OPTO}$ at node OPTO falls in response after the moment $t_{SENS}$. At the moment when node voltage $V_{OPTO}$ falls below reference voltage $V_{QC}$, fast response detector 232 generates the pulse of the compulsive signal $S_{F\_ON}$ to make PWM signal $S_{OUT}$ become 1 in logic. Meanwhile, the compensation voltage $V_{COMP}$ is still under control of the voltage sample held in the sample/hold circuit 222, which memorizes the previous status of no load. Accordingly, the first ON time $T_{ON}$ in FIG. 9 could be as short as a predetermined minimum ON time $T_{MIN-ON}$. Nevertheless, after the first ON time $T_{ON}$ in FIG. 9, the secondary winding LS demagnetizes and the sample/hold circuit 222 is now capable of detecting the falling of output voltage $V_{OUT}$. After the first switch cycle when output voltage $V_{OUT}$ has been detected as being far below the voltage rating, the ON time $T_{ON}$ in the following switch cycle lengthens and more energy is transferred, causing output voltage $V_{OUT}$ to ramp up, as shown in FIG. 9. The function demonstrated in FIG. 9 is referred to as quick response, which benefits the charger 200 in FIG. 6 in preventing output voltage $V_{OUT}$ from becoming over-low when a load switches suddenly from light to heavy.

Figure 10:
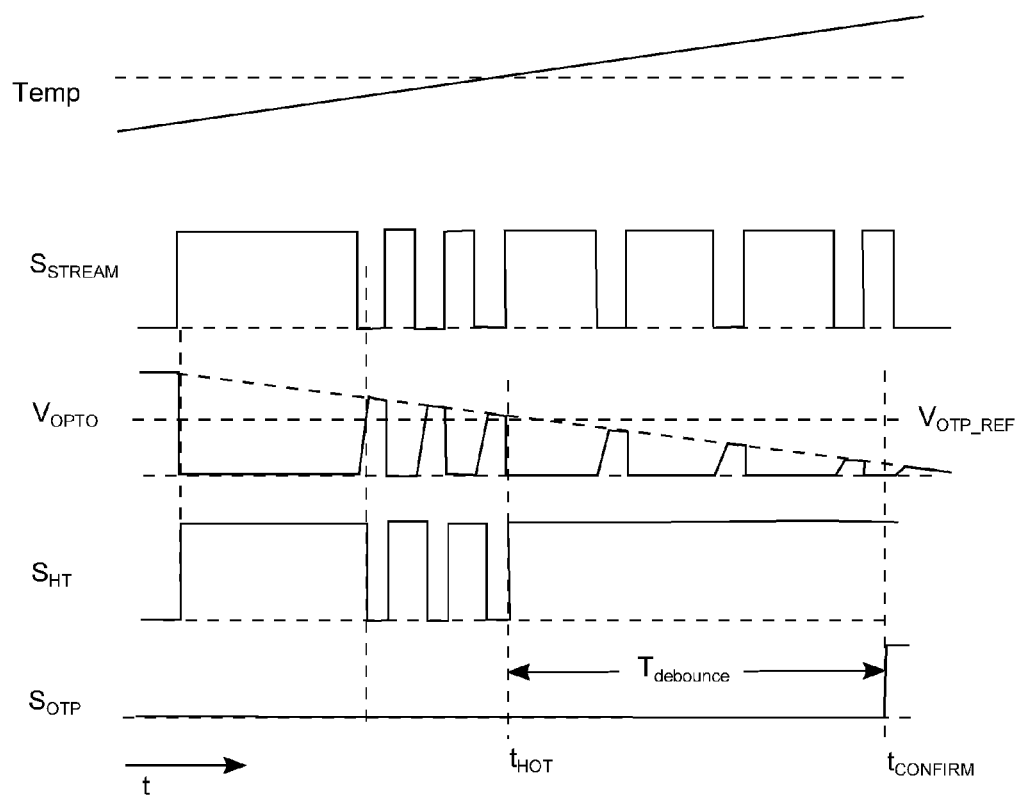
FIG. 10 illustrates the waveforms of the temperature of thermistor 202, driving signal $S_{STREAM}$, node voltage $V_{OPTO}$, comparison result $S_{HT}$, and over-temperature protection signal $S_{OTP}$.

Please refer to FIGS. 7 and 10, where waveforms in FIG. 10 indicate the temperature of thermistor 202, driving signal $S_{STREAM}$ in the secondary side 14S, node voltage $V_{OPTO}$ at node OPTO, comparison result $S_{HT}$, and over-temperature protection signal $S_{OTP}$, respectively. As shown in FIG. 10, the temperature of thermistor 202 increases steadily because of an unknown abnormal event, which could cause accidental fire if the temperature reaches a critical point. In response to the increase of the temperature, the resistance of thermistor 202 becomes less, and so does the voltage level of node voltage $V_{OPTO}$ when driving signal $S_{STREAM}$ is at a low voltage level. The comparison result $S_{HT}$ changes when node voltage $V_{OPTO}$ goes across reference voltage $V_{OPT\_REF}$.

Debouncing circuit 234 is capable of determining whether over temperature has happened. As demonstrated in FIG. 10, even though comparison result $S_{HT}$ has changed several times before the moment $t_{HOT}$, over-temperature protection signal $S_{OTP}$ continues staying at 0 in logic because each time period when comparison result $S_{HT}$ stays at 1 is not long enough. After the moment $t_{HOT}$, comparison result $S_{HT}$ starts to constantly stay at 1 because node voltage $V_{OPTO}$ is always underneath reference voltage $V_{OPT\_REF}$ due to the hot temperature. If comparison result $S_{HT}$ has stayed at 1 for a period longer than a present debounce time $T_{debounce}$, as it happens at moment $t_{CONFIRM}$ FIG. 10, then confirm in over-temperature protection signal $S_{OTP}$ turns to 1 in logic to confirm the occurrence of over temperature. Over-temperature protection signal $S_{OTP}$ with 1 in logic causes PWM signal $S_{OUT}$ to be 0, constantly turning the power switch SW OFF and stopping power conversion. As power conversion stops, the unknown abnormal event, which causes the rising of the temperature, might pass away or disappear because there is supposedly no more power supplied to the unknown abnormal event. Eventually, the temperature could go down, and the accidental fire is prevented from happening. Therefore, over-temperature protection (OTP) is achieved. In one embodiment, debounce time $T_{debounce}$ must be longer than 6 ms, so the transmission of header 80 won't be misinterpreted as the occurrence of high temperature. Debounce time $T_{debounce}$ could be 12 ms, for example.

In the charger 200 in FIG. 6, the primary-side controller 204 has a multi-function pin denoted as node OPTO, via which at least three functions can be performed, including 1) to receive a command code from the secondary side; 2) to response fast when output voltage $V_{OUT}$ suddenly drops; and 3) to provide OTP. For some other embodiments, a primary-side controller might have a multi-function pin, via which only two of the three functions can be performed. For some embodiments, more than the three functions are performed by a primary-side controller via a multi-function pin.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control circuit suitable for a power supply with a primary side and a secondary side galvanically isolated from each other, wherein the power supply comprises a transformer with a primary winding and a secondary winding magnetically coupled to each other, the primary winding and the secondary winding are located in the primary side and the secondary side respectively, and the transformer is configured to transfer electric energy from the primary side to the secondary side and to build an output power source in the secondary side, the control circuit comprising:
    a primary-side controller in the primary side, configured to control a current through the primary winding; and
    a secondary-side controller in the secondary side, powered by the output power source, configured to provide a command code with several command bits sequentially transmitted to the primary-side controller so as to set an operation mode that the primary-side controller operates in;
    wherein the primary-side controller determines a voltage rating of the output power source based upon the command code with the command bits.

2. The control circuit of claim 1, further comprising a photo coupler as a message channel through which the command code is transmitted from the secondary side to the primary side.

3. The control circuit of claim 1, wherein the command code is encoded based on a coding rule, received bits are generated in the primary side in response to the command code, and when the received bits are determined to be in compliance with the coding rule, the operation mode is set.

4. The control circuit of claim 1, wherein the command code comprises data bits and verification bits, and the verification bits are in inverse logic to data bits respectively.

5. The control circuit of claim 1, wherein the secondary-side controller is configured to generate command pulses at a node to transmit the command code, each of the command pulses representing a corresponding command bit.

6. The control circuit of claim 5, wherein each of command bits has a logic value that determines a pulse width of a corresponding command pulse.

7. The control circuit of claim 1, wherein the secondary-side controller is configured to transmit a header to the primary side prior to transmitting the command code.

8. The control circuit of claim 7, wherein the secondary-side controller is configured to generate command pulses at a node to transmit the command code, each of the command pulses representing a corresponding command bit, and before generating the command pulses, the secondary-side controller generates a header pulse at the node.

9. The control circuit of claim 8, wherein the header pulse has a pulse width larger than each of the command pulses.

10. The control circuit of claim 1, wherein the command code is encoded based on a coding rule, and the coding rule makes a coding duration for transmitting the command code a constant, independent to variation to the command code.

11. A control method suitable for a power supply with a primary side and a secondary side galvanically isolated from each other, wherein the power supply comprises a transformer with a primary winding and a secondary winding magnetically coupled to each other, the transformer is configured to transfer electric power from the primary side to the secondary side for building an output power source in the secondary side, the control method comprising:
    sequentially transmitting command bits from the secondary side to the primary side, so as to generate received bits in the primary side;
    based upon the received bits, selecting an operation mode determining a voltage rating of the output power source; and
    determining a voltage rating of the output power source based upon the received bits.

12. The control method of claim 11, wherein the command bits are transmitted from the secondary side to the primary side through a photo coupler.

13. The control method of claim 11, wherein the command bits compose of a command code in compliance with a coding rule, the control method comprising:
    checking whether the received bits are in compliance with the coding rule; and
    selecting the operation mode based upon the received bits if the received bits are in compliance with the coding rule.

14. The control method of claim 13, wherein the coding rule makes a coding duration for transmitting the command code a constant, independent to variation to the command code.

15. The control method of claim 13, wherein the command code comprises data bits and verification bits, and the coding rule demands the data bits in inverse to the verification bits respectively.

16. The control method of claim 11, wherein the command bits causes command pulses in the secondary side respectively, and each of command bits has a logic value determining a pulse width of a corresponding command pulse.

17. The control method of claim 11, further comprising:
    transmitting a header from the secondary side to the primary side prior to transmitting the command bits.

18. The control method of claim 17, wherein the command bits are transmitted by generating command pulses in the secondary side, each of command bits has a logic value determining a pulse width of a corresponding command pulse, the header is transmitted by generating a header pulse in the secondary side, and the header pulse has a pulse width larger than each of the command pulses.

19. The control method of claim 11, comprising:
detecting from the primary side and via the transformer an output voltage of the output power source.

20. A primary-side controller, formed in an integrated circuit, suitable for a power supply with a primary side and a secondary side galvanically isolated from each other, comprising:
   a pulse-width modulator providing a pulse-width-modulation signal to control a power switch;
   a multi-function pin with a node voltage;
   a fast-response detector coupled between the pulse-width modulator and the multi-function pin, wherein when the node voltage fits a first criterion the fast-response detector triggers the pulse width modulator to turn ON the power switch; and
   an over-temperature protection circuit coupled between the pulse width modulation and the multi-function pin, wherein when the node voltage fits a second criterion, the over-temperature protection circuit causes the pulse width modulator to constantly turn the power switch OFF.

21. The primary-side controller of claim 20, wherein when the node voltage falls below a reference voltage and the power switch has been turned OFF for a minimum OFF time, the fast-response detector triggers the pulse width modulator to turn the power switch ON.

22. The primary-side controller of claim 20, wherein a comparison result is generated by comparing the node voltage and a reference voltage, and when the second criterion is that the comparison result has been kept at a logic value for at least a predetermined debounce time.

23. The primary-side controller of claim 20, further comprising:
   a decoder, for generating received bits based on voltage variation at the multi-function pin to determine a reference voltage; and
   the reference voltage determines a voltage rating of an output power source at the secondary side.

24. The primary-side controller of claim 20, further comprising:
   a reference-voltage selector, coupled to the decoder, for selecting one of several preset voltages to be the reference voltage.

25. A power supply with a primary side and a secondary side galvanically isolated from each other, comprising:
   the primary-side controller of claim 20; and
   a thermistor coupled to the multi-function pin.

26. The power supply of claim 25, further comprising:
   a secondary-side controller at the secondary side; and
   a photo coupler coupled between the secondary-side controller and the multi-function pin;
   wherein the secondary-side controller is configured to provide a command code with command bits sequentially transmitted from the secondary side to the primary side via the photo coupler and the multi-function pin.

* * * * *